(12) United States Patent
Nitschke et al.

(10) Patent No.: US 9,809,485 B2
(45) Date of Patent: Nov. 7, 2017

(54) LIFT DEVICE FOR A GLASS PROCESSING SYSTEM

(71) Applicant: GLASSTECH, INC., Perrysburg, OH (US)

(72) Inventors: Dean M. Nitschke, Maumee, OH (US); Stephen D. Snyder, Whitehouse, OH (US)

(73) Assignee: GLASSTECH, INC., Perrysburg, OH (US)

( * ) Notice: Subject to any disclaimer, the term of this patent is extended or adjusted under 35 U.S.C. 154(b) by 7 days.

(21) Appl. No.: 14/929,799

(22) Filed: Nov. 2, 2015

(65) Prior Publication Data
US 2017/0121213 A1    May 4, 2017

(51) Int. Cl.
| | |
|---|---|
| *C03B 23/035* | (2006.01) |
| *C03B 35/24* | (2006.01) |
| *B65G 51/03* | (2006.01) |
| *C03B 23/023* | (2006.01) |
| *C03B 35/16* | (2006.01) |
| *C03B 35/14* | (2006.01) |
| *C03B 35/20* | (2006.01) |
| *C03B 23/03* | (2006.01) |

(52) U.S. Cl.
CPC .............. *C03B 35/24* (2013.01); *B65G 51/03* (2013.01); *C03B 23/023* (2013.01); *C03B 23/03* (2013.01); *C03B 23/0355* (2013.01); *C03B 23/0357* (2013.01); *C03B 35/145* (2013.01); *C03B 35/16* (2013.01); *C03B 35/202* (2013.01)

(58) Field of Classification Search
CPC .................................................. C03B 23/035
See application file for complete search history.

(56) References Cited

U.S. PATENT DOCUMENTS

| | | | |
|---|---|---|---|
| 3,806,312 A | 4/1974 | McMaster et al. | |
| 3,934,970 A | 1/1976 | McMaster et al. | |
| 3,947,242 A | 3/1976 | McMaster et al. | |
| 3,994,711 A | 11/1976 | McMaster | |
| 4,202,681 A | 5/1980 | McMaster et al. | |
| 4,204,854 A | 5/1980 | McMaster et al. | |
| 4,222,763 A | 9/1980 | McMaster | |
| 4,356,018 A | 10/1982 | McMaster | |
| 4,514,208 A | 4/1985 | Nitschke | |
| 4,865,638 A * | 9/1989 | Kudo | C03B 23/03 65/104 |

(Continued)

OTHER PUBLICATIONS

PCT Transmittal of International Search Report and Written Opinion of the International Searching Authority dated Nov. 16, 2016, Application No. PCT/US16/57683, Applicant Glasstech, Inc. 9 Pages.

*Primary Examiner* — Cynthia Szewczyk
(74) *Attorney, Agent, or Firm* — Brooks Kushman P.C.

(57) ABSTRACT

A lift device for lifting a glass sheet in a glass processing system includes a lift jet array having peripheral lift jet outlets and inner lift jet outlets disposed inwardly of the peripheral lift jet outlets. Furthermore, each lift jet outlet is operable to allow gas to flow toward the glass sheet. The lift device also includes a control unit for controlling operation of the lift jet outlets, and the control unit is configured to commence operation of at least one of the inner lift jet outlets prior to commencing operation of at least one of the peripheral lift jet outlets.

24 Claims, 9 Drawing Sheets

(56) References Cited

U.S. PATENT DOCUMENTS 5,622,539 A * 4/1997 Lesage ................ C03B 23/0352
                                                                       65/106
2015/0274571 A1   10/2015  Brennan et al.
2015/0274575 A1   10/2015  Brennan et al.

\* cited by examiner

LIFT DEVICE FOR A GLASS PROCESSING SYSTEM

TECHNICAL FIELD

The present disclosure relates to a lift device for lifting a glass sheet in a glass processing system.

BACKGROUND

Prior apparatuses for lifting glass sheets are disclosed in by U.S. Pat. Nos. 4,204,854 and 4,356,018, for example.

SUMMARY

A lift device, according to the disclosure, for lifting a glass sheet in a glass processing system includes a lift jet array having peripheral lift jet outlets and inner lift jet outlets disposed inwardly of the peripheral lift jet outlets. Furthermore, each lift jet outlet is operable to allow gas to flow toward the glass sheet. The lift device also includes a control unit for controlling operation of the lift jet outlets, and the control unit is configured to commence operation of at least one of the inner lift jet outlets prior to commencing operation of at least one of the peripheral lift jet outlets.

According to another aspect of the disclosure, a lift device for lifting a glass sheet in a glass processing system includes a lift jet array having multiple peripheral lift jet outlets and multiple inner lift jet outlets disposed inwardly of the peripheral lift jet outlets. At least one peripheral lift jet outlet is angled toward a central plane of the lift jet array, and at least one inner lift jet outlet proximate the at least one peripheral lift jet is angled away from the central plane.

A method according to the disclosure of lifting a glass sheet in a glass processing system includes positioning the glass sheet above a lift jet array including multiple peripheral lift jet outlets and multiple inner lift jet outlets disposed inwardly of the peripheral lift jet outlets. The method further includes commencing operation of at least one of the inner lift jet outlets such that gas flows from the at least one inner lift jet outlet toward the glass sheet, and commencing operation of at least one of the peripheral lift jet outlets such that gas flows from the at least one peripheral lift jet outlet toward a peripheral portion of the glass sheet. The lift jet outlets are operable to facilitate lifting of the glass sheet toward a tool, and commencing operation of the at least one peripheral lift jet outlet is performed subsequent to commencing operation of the at least one inner lift jet outlet to inhibit gas from flowing between the glass sheet and the tool.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, as those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without one or more of the specific features explained in the following description.

During manufacture of a glass sheet product, such as a glass mirror panel for a solar power collection application, a vehicle windshield, rear window, or any other suitable product, it may be desirable to lift a sheet of glass in connection with a forming or bending operation (e.g., to raise the glass sheet against a mold tool), or in connection with any other glass processing operation, to facilitate processing of the glass sheet. In the present disclosure, methods and apparatuses are provided for lifting glass sheets during such operations to improve glass processing (e.g., so that tight shape tolerances and/or improved optics may be achieved).

Figure 1:
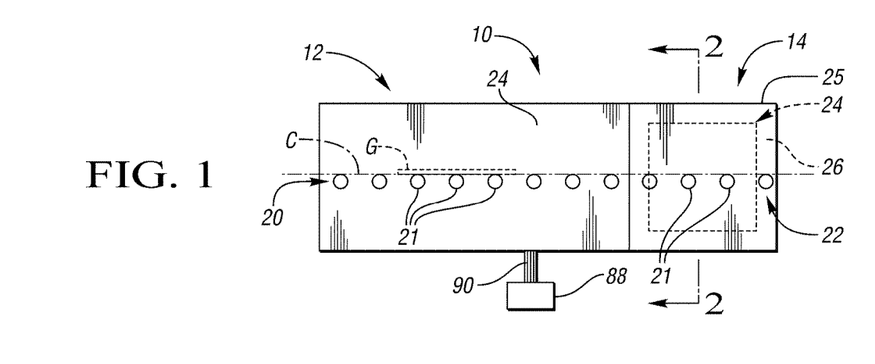
FIG. 1 is a schematic elevational view of a glass sheet processing system including a forming station having a lifting device according to the disclosure for lifting a heated glass sheet.
Figure 2:
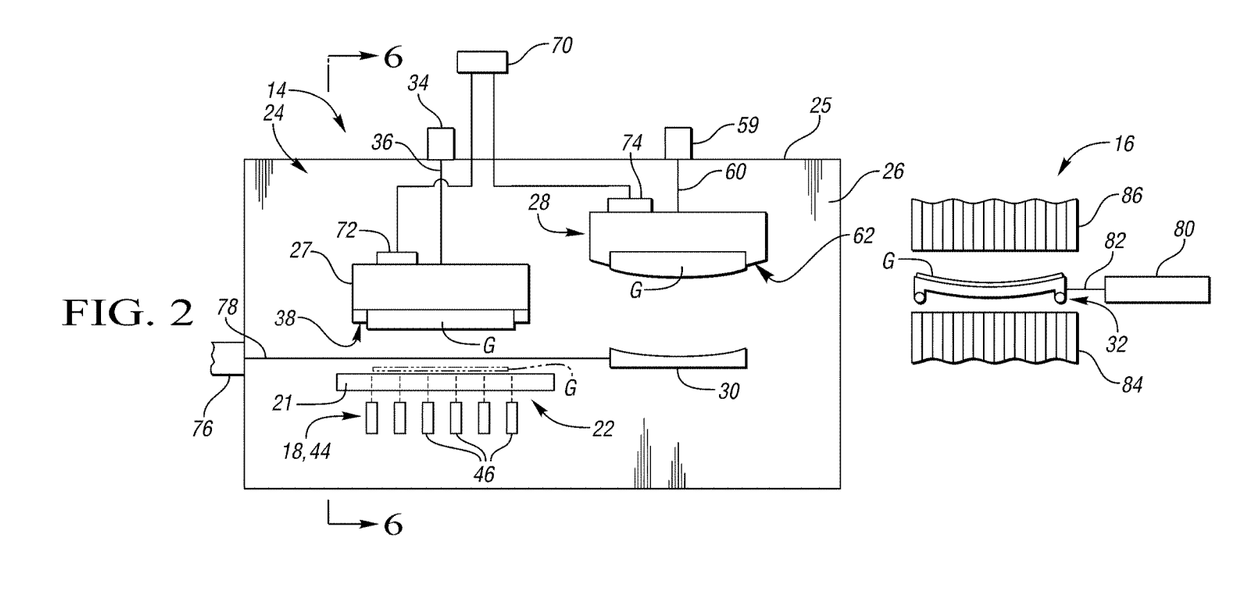
FIG. 2 is a sectional view taken through the forming station along the direction of line 2-2 in FIG. 1 and illustrates a forming apparatus that includes first and second upper molds, a lower mold and a delivery mold for performing three stage forming of a hot glass sheet with transverse curvature and its subsequent delivery.

Referring to FIGS. 1 and 2, a glass processing system 10 is shown for processing glass sheets G. The system 10 includes a heating apparatus or station, such as a furnace 12, for heating the glass sheets G; a forming or bending station 14 for forming or bending each glass sheet G into a desired shape; and a cooling station, such as an annealing station or a quench station 16, configured to cool each glass sheet G. In the embodiment shown in FIGS. 1 and 2, the system 10 further includes a lift device 18, according to the present disclosure, positioned in the bending station 14 for lifting glass sheets G during the forming or bending process, as explained below in detail.

The furnace 12 may have any suitable configuration for heating the glass sheets G. For example, the furnace 12 may include any suitable heating elements (not shown) positioned above and/or below a conveyor or conveyor system 20, which may be used to convey the glass sheets G in a generally horizontally extending orientation along a plane of conveyance C through the furnace 12. As a more detailed example, the heating elements may include radiant heating elements, such as electric heaters, and/or convective heating elements, such as hot gas or hot air distributors. The conveyor system 20 may be a roller conveyor type including rollers 21 like those disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al., which are hereby incorporated by reference.

Likewise, the bending station 14 may have any suitable configuration for hot glass forming or bending each glass sheet G into a particular shape. For example, the bending station 14 may have a conveyor or conveyor system 22, which may be a separate conveyor system or part of the conveyor system 20, for receiving a heated glass sheet G; and a glass sheet forming apparatus or bending apparatus 24, shown schematically in FIG. 1, for forming or bending the glass sheet G. Furthermore, the bending station 14 has an insulated housing 25 defining a heated chamber 26 (e.g., heated to a temperature in the range of 610 to 725 degrees centigrade (° C.), or at least 600° C.) in which the bending apparatus 24 is located. Although rollers 21 of the conveyor system 22 are shown contained within the housing 25 in FIG. 2, ends of each roller 21 may extend laterally beyond side walls of the housing 25.

Referring to FIG. 2, the bending apparatus 24 may be configured as a multiple stage bending apparatus for bending a glass sheet G in multiple stages (e.g., three stages). In the embodiment shown in FIG. 2, the bending apparatus 24 includes a first upper mold 27 that functions during a first stage of the hot glass sheet forming or bending, a second upper mold 28 that functions during a press forming stage of the hot glass sheet forming, a lower mold 30 that receives the glass sheet G from the first upper mold 27 for gravity sagging and moves the glass sheet G from the first upper mold 27 to the second upper mold 28 and cooperates with the second upper mold 28 to provide the press forming, and a delivery mold 32 that receives the formed glass sheet G from the second upper mold 28 for delivery from the bending station 14 to the quench station 16.

Figure 3:
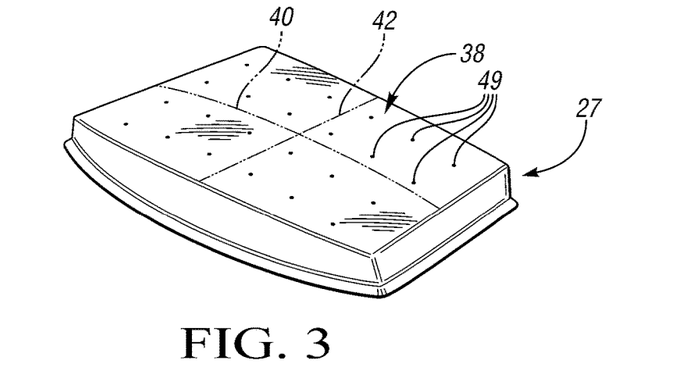
FIG. 3 is a perspective view of the first upper mold with its normally downwardly forming convex surface shown facing generally upwardly for purposes of illustration.
Figure 6:
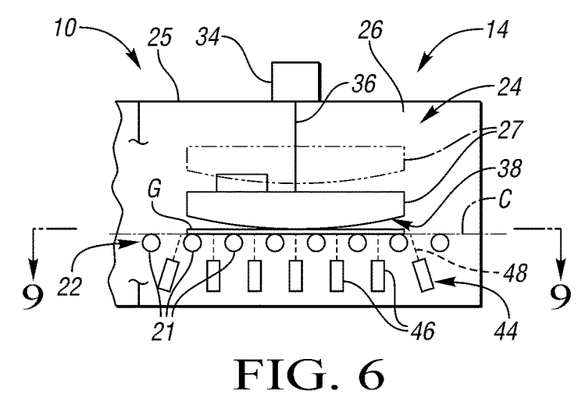
FIG. 6 is a view taken along the direction of line 6-6 of FIG. 2 to show the initial pickup of the hot glass sheet from a conveyor system by the first upper mold for the initial forming.

With continuing reference to FIG. 2, a schematically indicated actuator 34, such as one or more cylinders, has one or more connections 36 to the first upper mold 27 to provide movement thereof between an upper position above the conveyor system 22 and, as shown in FIG. 6, a lower position adjacent the conveyor system 22 and a conveyed hot glass sheet G. The first upper mold 27 has a downwardly facing surface 38 that has a downwardly convex shape shown in FIG. 6 and illustrated by phantom line 40 in FIG. 3. The mold surface 38 also has straight line elements, such as illustrated by phantom line 42, that may be provided by a cylindrical shape or a partial conical shape.

The lift device 18 in the bending station 14 may be configured as a gas lift jet array 44 for lifting and bending the heated glass sheet G. Referring to FIGS. 2 and 6, the lift jet array 44 is located below the plane of conveyance C of the hot glass sheet G and includes multiple, spaced apart lift jet outlets or gas jet outlets 46, such as nozzles, spouts, or pumps, that supply upwardly directed gas jets 48 (e.g., jet streams) for lifting the glass sheet G upwardly from the conveyor system 22 to initially form and support the glass sheet against the downwardly facing surface 38 of the first upper mold 27, which is then moved upwardly to its upper position with the glass sheet G supported against its downwardly facing surface 38, as shown in FIG. 2. The downwardly facing surface 38 of the first upper mold 27 may also have an array of vacuum holes 49 through which a vacuum may be drawn to assist in initial lifting of the glass sheet G and to then support the glass sheet as is hereinafter described.

As shown in FIG. 6, the lift jet array 44 may be configured such that gas jets 48 of the gas jet outlets 46 pass between the conveyor rollers 21. In that regard, some gas jets 48 may flow generally vertically, while other gas jets 48 may flow at angles with respect to a vertical plane. Such a configuration may be particularly advantageous when spacing between adjacent conveyor rollers 21 is fixed, or when the conveyor rollers 21 are not able to be easily adjusted. Furthermore, each gas jet outlet 46 may be made of any suitable material, such as stainless steel or any other suitable metal, and may be of the type disclosed by U.S. Pat. Nos. 4,204,854 and 4,356,018, which are hereby incorporated by reference, such that a primary gas flow therefrom induces a secondary gas flow many times the extent of the primary gas flow in order to provide the lifting.

Figure 9:
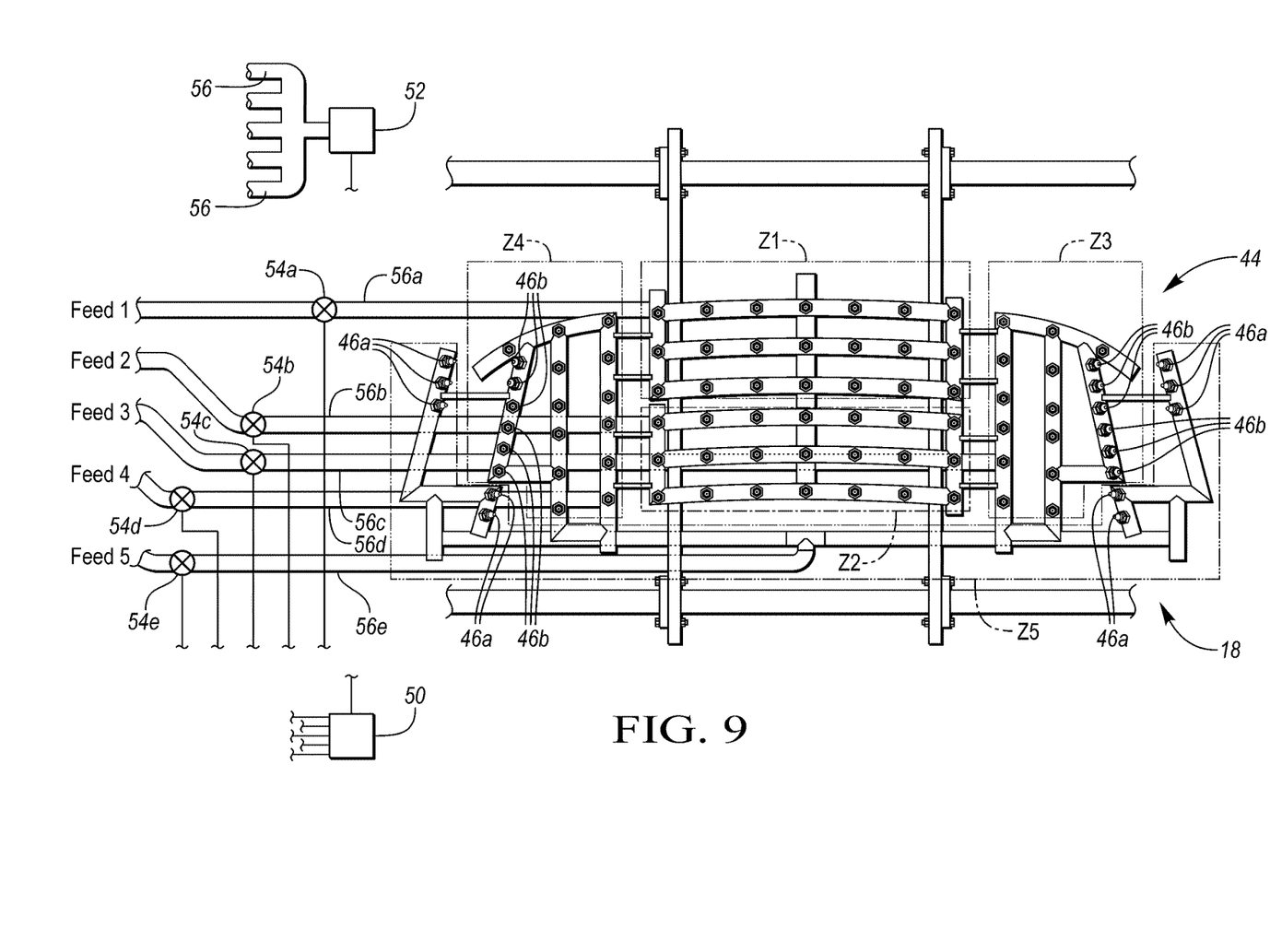
FIG. 9 is a plan view taken along the direction of line 9-9 in FIG. 6 to illustrate the lift device including a gas lift jet array that operates to perform the initial pickup of the glass sheet from the conveyor system by the first upper mold.

Referring to FIG. 9, the gas jet outlets 46 of the lift device 18 include multiple peripheral or outer gas jet outlets 46a and multiple inner gas jet outlets 46b disposed inwardly of the peripheral gas jet outlets 46a. The peripheral gas jet outlets 46a are configured to lift and support peripheral portions of the glass sheet G, and the inner gas jet outlets 46b are configured to lift and support peripheral portions of the glass sheet G and/or inner portions of the glass sheet G (i.e., portions of the glass sheet G disposed inwardly of the peripheral portions). Furthermore, the peripheral lift jet outlets 46a may define an outline that is different than a periphery of the glass sheet G when the glass sheet G is positioned above the lift jet array 44 and not in a lifted state.

The gas jet outlets 46 may be provided in one or more controllable portions or zones. In the embodiment shown in FIG. 9, for example, the gas jet outlets 46 are divided into five zones, Z1-Z5, that are separately controllable. For example, the lift device 18 may include a controller or control unit 50, a pressurized gas (e.g., air) source 52 (e.g., tank, pump, or blower) and multiple controllable valves 54 that are adjustably controllable, such as by the control unit 50, to provide gas at a desired pressure to each of multiple supply conduits 56 that supply gas to the five zones, as explained below in greater detail. Furthermore, the control unit 50 may include any suitable hardware and/or software for controlling operation of the lift device 18 (e.g., for performing the particular algorithms represented by the functions described herein). For example, the control unit 50 may include one or more processors in communication with one or more storage devices or memory units, which include computer readable program instructions that are executable by the one or more processors so that the control unit 50 may control operation of the gas source 52, valves 54, etc. The control unit 50 may also, or instead, include one or more application specific integrated circuits, programmable gate arrays, programmable logic devices, and/or digital signal processors.

Figure 10:
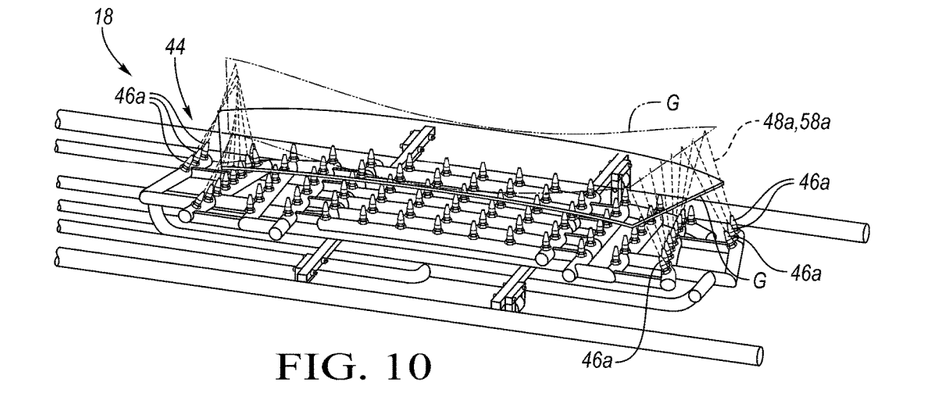
FIG. 10 is a perspective view of the lift device for lifting the glass sheet from a generally flat condition on the conveyor system to a raised and bent condition, shown in phantom lines (the conveyor system is not shown for clarity purposes)
Figure 11:
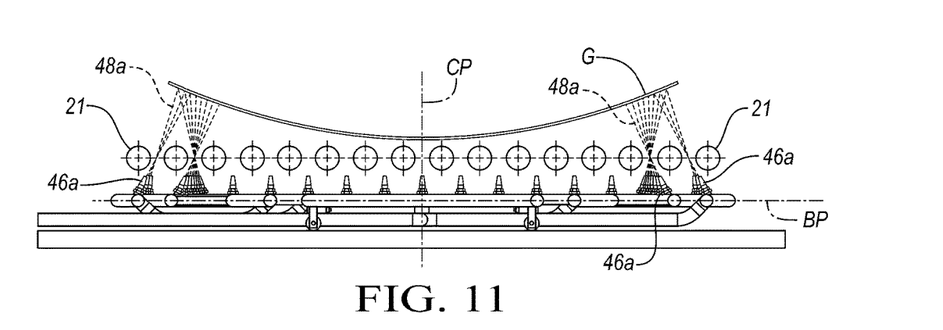
FIG. 11 is a side view of the lift device and conveyor system, showing the glass sheet in the raised and bent condition.
Figure 12:
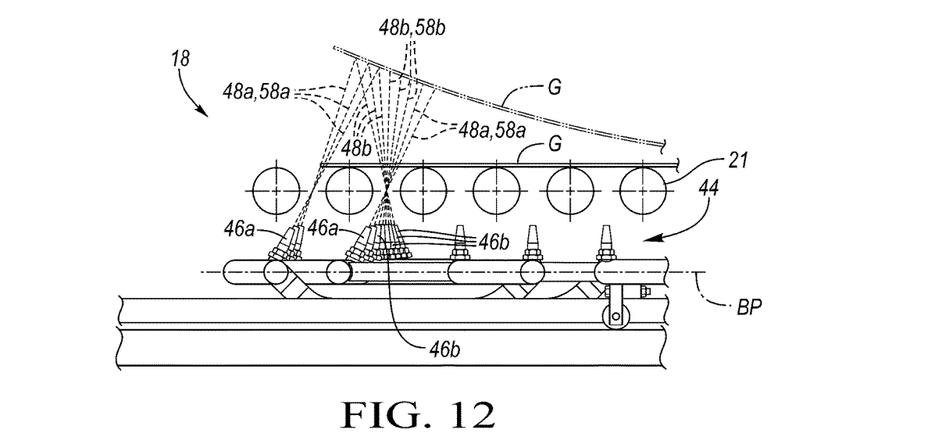
FIG. 12 is an enlarged side view of a portion of the lift device shown in FIG. 11.

Referring to FIGS. 10-12, one or more (e.g., at least one, two, three, or four) of the peripheral gas jet outlets 46a may be positioned outwardly of the glass sheet G when the glass sheet G is positioned above the lift jet array 44 in an un-lifted state, and the one or more peripheral gas jet outlets 46a may be angled toward a central plane CP, e.g., vertical central plane, of the lift jet array 44. For example, one, two, three or four of the peripheral gas jet outlets 46a may be positioned outwardly of the glass sheet G and each angled toward the central plane CP at an angle in the range of 51 to 89.9 degrees (measured between a central axis 58a of the respective peripheral gas jet outlet 46a and a base plane BP, e.g., horizontal plane or other plane that is perpendicular to the central plane CP, of the lift jet array 44), or more particularly at an angle in the range of 59.9 to 78.9 degrees, when the glass sheet G is positioned above the lift jet array 44 and not in a lifted state. In the embodiment shown in FIG. 10, at least five peripheral gas jet outlets 46a are positioned outwardly of the glass sheet G at each end of the glass sheet G when the glass sheet G is in an un-lifted state (see glass sheet G shown in solid lines), and each of those peripheral gas jet outlets 46a is angled toward the central plane CP.

At one or both ends of the lift jet array 44, one or more (e.g. at least one, two, three, or four) of the inner gas jet outlets 46b, which are positioned inwardly of the periphery of the glass sheet G when the glass sheet G is in the un-lifted state, may be angled away from the central plane CP. For example, at each end of the lift jet array 44, one or more of the inner gas jet outlets 46b, which are positioned on the same side of the central plane CP as the one or more peripheral gas jet outlets 46a that are angled toward the central plane CP or which are each positioned proximate (e.g., within 10 to 23 cm of, or more particularly within 13.2 to 18.8 cm of) one of the one or more such peripheral gas jet outlets 46a, may each be angled away from the central plane CP at an angle in the range of 51 to 89.9 degrees (measured between a central axis 58b of the respective inner gas jet outlet 46b and the base plane BP of the lift jet array 44) or more particularly at an angle in the range of 59.9 to 78.9 degrees. In the embodiment shown in FIGS. 10 and 11, at least three inner gas jet outlets 46b at each end of the lift jet array 44 are angled away from the central plane CP.

Furthermore, at each end of the lift jet array 44, one or more other inner gas jet outlets 46b, which are positioned inwardly of the periphery of the glass sheet G when the glass sheet G is in the un-lifted state, may be angled toward the central plane CP. For example, one or more inner gas jet outlets 46b, which are positioned on the same side of the central plane CP as the one or more peripheral gas jet outlets 46a that are angled toward the central plane CP or which are each positioned proximate (e.g., within 10 to 23 cm of, or more particularly within 13.2 to 18.8 cm of) one of the one or more such peripheral gas jet outlets 46a, may each be angled toward the central plane CP at an angle in the range of 51 to 89.9 degrees (measured between a central axis 58b of the respective inner gas jet outlet 46b and the base plane BP of the lift jet array 44)) or more particularly at an angle in the range of 59.9 to 78.9 degrees.

With the above configuration, the lift device 18 is operable to effectively and efficiently lift a glass sheet G, e.g., off of conveyor system 22 and toward the first upper mold 27. Furthermore, the gas jet outlets 46 of the lift jet array 44 may be sequentially controlled to provide effective lifting, while inhibiting gas from flowing between the glass sheet G and the first upper mold 27. For example, the control unit 50 may be configured to sequentially commence operation of the lift jet outlets, such that operation of at least one of the inner lift jet outlets 46b may be initiated prior to commencing operation of at least one of the peripheral lift jet outlets 46a. As a more detailed example, operation of the gas jet outlets 46 in the first through the fourth zones Z1-Z4 may be initiated first to raise glass sheet G off of the conveyor system 22 and commence bending of the glass sheet G. After sufficient lifting and/or bending of the glass sheet G, e.g., after 0.1 to 0.5 seconds, or more particularly after about 0.2 seconds, of operation of the gas jet outlets 46 of zones Z1-Z4, operation of the peripheral gas jet outlets 46a of the fifth zone Z5 may be initiated to further lift and/or bend end portions of the glass sheet G sufficiently toward the first upper mold 27. Because the peripheral gas jet outlets 46a of the fifth zone Z5 are disposed outwardly of the glass sheet G and are angled toward the central plane CP, gas can be prevented from flowing between the glass sheet G and the first upper mold 27 by commencing operation of those gas jet outlets 46a after commencing operation of the other gas jet outlets 46.

Furthermore, because the peripheral gas jet outlets 46a of the fifth zone Z5 may be angled toward the central plane CP, the jets 48 emitted therefrom may contact the glass sheet G at more desirable angles (e.g., angles in the range of 50 to 90 degrees). As a result, the peripheral gas jet outlets 46a of the fifth zone Z5 may provide effective bending and/or lifting of the glass sheet G toward the downwardly facing surface 38 of the first upper mold 27. In addition, as shown in FIG. 12, gas jets 48 from different gas outlets 46 may converge at the glass sheet G, or otherwise generally contact the same area or portion of the glass sheet G, to facilitate bending and/or lifting of the glass sheet G. For example, a gas jet 48a from a peripheral gas outlet 46a that is angled toward the central plane CP may converge at the glass sheet G with a gas jet 48b of an inner gas outlet 46b that is angled away from the central plane CP.

Figure 4:
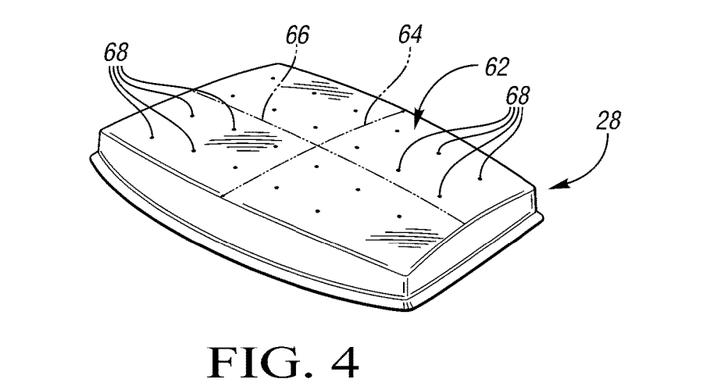
FIG. 4 is a perspective view of the second upper mold with its normally downwardly forming convex surface also shown facing generally upwardly for purposes of illustration.

Returning to FIG. 2, the second upper mold 28 of the bending station 14 is spaced horizontally away from the first upper mold 27 within the heated chamber 26 of the bending station housing 25, and is movable vertically by an actuator 59 and a connection 60 like the actuator and connection associated with the first upper mold 27. The vertical movement of the second upper mold 28 is between an upper position located above the elevation of the plane of conveyance C and a lower position (FIG. 7) closer to the elevation of the plane of conveyance C. The second upper mold 28 has a downwardly facing surface 62 of a downwardly convex shape with curvature in transverse directions without any straight line elements as shown by the curved phantom lines 64 and 66 in FIG. 4. The second upper mold 28 also has an array of vacuum holes 68 in its downwardly facing surface 62 for forming and supporting the heated glass sheet G against the second upper mold 28 during the forming cycle.

It should also be mentioned that the first and second upper molds 27 and 28 can also be moved upwardly and downwardly at the same time by a single actuator instead of separate actuators.

As shown in FIG. 2, a schematically indicated vacuum source 70 is operable to provide a vacuum at the downwardly facing surfaces 38 and 62 of the first and second upper molds 27 and 28. Actually, the source of vacuum can be provided by positive pressure air supplied to gas jet pumps 72 and 74 on the first and second upper molds 27 and 28, and the jet pumps may be of the type disclosed by U.S. Pat. Nos. 4,202,681 and 4,222,763 so as to be capable of drawing varying degrees of vacuum, as well as providing positive pressure air for providing glass sheet release during the forming operation as is hereinafter more fully described.

Figure 5:
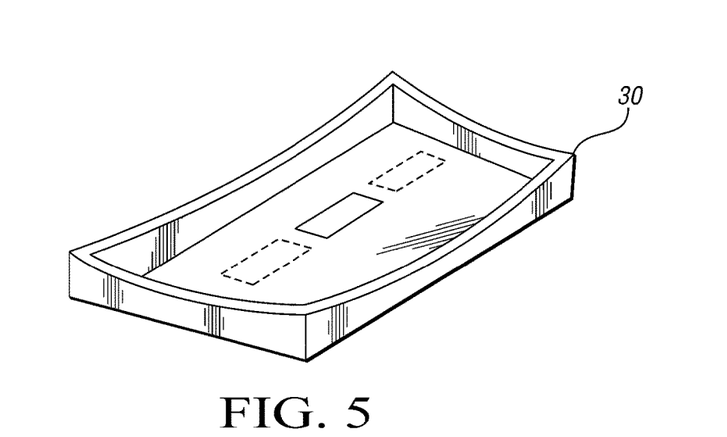
FIG. 5 is a perspective view of the lower mold which receives the initially formed glass sheet from the first upper mold for gravity sagging and movement to below the second upper mold for subsequent press forming.
Figure 7:
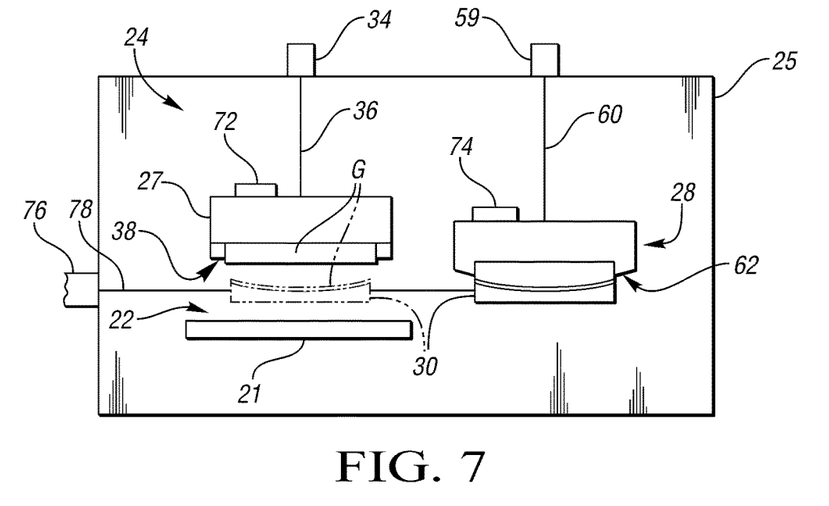
FIG. 7 is an elevational view taken in the same direction as FIG. 2 and illustrates the movement of the glass sheet on the lower mold from the first upper mold to below the second upper mold for the press forming with transverse curvature.

The lower mold 30 as best illustrated in FIG. 5 faces upwardly with an upwardly concave shape in transverse directions complementary to the downwardly convex shape of the downwardly facing surface 62 of the second upper mold 28. This lower mold 30 is movable by an actuator 76 and connection 78 horizontally within the heated chamber 26 of the bending station housing 25 to a location below the first upper mold 27 when the first upper mold 27 is in its upper position, as shown in FIG. 7, with the glass sheet G supported against its downwardly facing surface 38. The first upper mold 27 is then movable downwardly to release the glass sheet for transfer onto the lower mold 30. The release of the glass sheet G can be provided by the termination of the vacuum drawn and the termination of the upwardly directed gas jets provided by the gas jet array 44 previously described, as well as by providing positive pressure gas to the mold surface 38. The first upper mold 27 is then moved upwardly to its upper position and the lower mold 30 and the glass sheet G supported thereon are moved horizontally to a location below the second upper mold 28 while in its upper position as shown in FIG. 2. During this movement, the glass sheet G sags by gravity toward the shape of the lower mold 30 with curvature in transverse directions. The second upper mold 28 is then moved downwardly from its upper position shown in FIG. 2 to its lower position shown in FIG. 7 to cooperate with the lower mold 30 to press form the glass sheet G with curvature in transverse directions, and the second upper mold 28 then has a vacuum drawn at its downwardly facing surface 62 to support the glass sheet and is moved upwardly to its upper position shown in FIG. 8.

Figure 8:
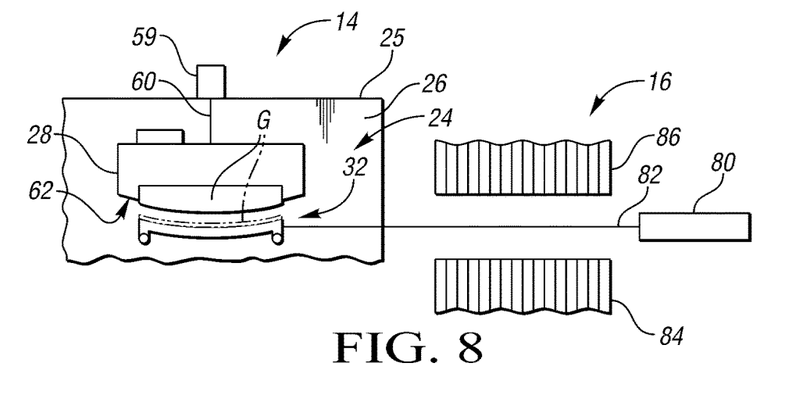
FIG. 8 is an elevational view taken in the same direction as FIG. 7 and illustrates the operation of the delivery mold for delivering the formed glass sheet from the forming station.

The glass forming operation continues by the lower mold 30 being moved out from under the second upper mold 28 and back under the first upper mold 27 as shown by phantom line representation in FIG. 7, while the delivery mold 32 is moved from its FIG. 2 position at the quench station 16 to a location below the second upper mold 28 to receive the glass sheet, as shown in FIG. 8, as the vacuum is terminated at the second upper mold 28 so the glass sheet G drops onto the delivery mold 32. The delivery mold 32 is then moved by its actuator 80 and connection 82 out of the bending station 14 for delivery or further processing of the pressed formed glass sheet, such as by quenching in the quench station 16 between lower and upper quench heads 84 and 86, as shown in FIG. 2.

The system 10 may further include a controller or control unit 88, shown in FIG. 1, for controlling operation of the above components. The control unit 88 may have a bundle of connections 90 for connecting with the various components of the system 10, such as the conveyor system 20, the conveyor system 22, the first upper mold 27, the second upper mold 28, the lower mold 30, the delivery mold 32, the lift device 18, the vacuum source 70 and the quench station 16. Furthermore, the control unit 88 may include any suitable hardware and/or software for controlling operation of the above components in order to perform the press forming of the glass sheet G, as well as its delivery and quenching (e.g., for performing the particular algorithms represented by the functions described herein). For example, the control unit 88 may include one or more processors in communication with one or more storage devices or memory units, which include computer readable program instructions that are executable by the one or more processors so that the control unit 88 may control operation of the conveyor system 20, the conveyor system 22, the first upper mold 27, the second upper mold 28, the lower mold 30, the delivery mold 32, the lift device 18, the vacuum source 70, the quench station 16, etc. The control unit 88 may also, or instead, include one or more application specific integrated circuits, programmable gate arrays, programmable logic devices, and/or digital signal processors. In lieu of the connections 90, the control unit 88 may instead be connected wirelessly to one or more of the above components. Furthermore, the control unit 50 of the lift device 18 may be part of the control unit 88, or the control unit 50 may be separate from the control unit 88 but configured to communicate with the control unit 88.

In the three stage bending station disclosed, the vacuum source 70 shown in FIG. 2 is operated by the control unit 88 shown in FIG. 1 to provide a vacuum to the downwardly facing surface 38 of the first upper mold 27 in order to cooperate with the lift device 18 in lifting the glass sheet G from the roll conveyor 22 into contact with the first upper mold 27 at its downwardly facing surface 38 for initially forming and support of the glass sheet G. After the glass sheet G is moved upwardly and contacts the downwardly facing surface 38 of the first upper mold 27, the control unit 88 may terminate the operation of the gas lift jet array 44 while continuing to provide the vacuum that is then the sole support of the glass sheet G on the first upper mold 27.

Returning to FIG. 9, additional aspects of the lift device 18 will now be described in more detail. The gas jet outlets 46 of the first and second zones Z1 and Z2, respectively, are configured to provide lifting of central portions of the glass sheet G, the gas jet outlets 46 of the third and fourth zones Z3 and Z4 are configured to provide lifting of intermediate and end portions of the glass sheet G, and the gas jet outlets 46 of the fifth zone Z5, which extend beyond the opposite end portions of the glass sheet G, are configured to provide lifting of the end portions of the glass sheet G. In another embodiment, the gas jet outlets 46 at opposite ends of the gas jet array 44 may be provided in separate zones. Furthermore, as mentioned above, operation of the gas jet outlets 46 of zones Z1 through Z5 may be initiated sequentially. For example, the control unit 50 or the control unit 88 may control operation of the gas source 52 and valves 54 such that valves 54a-54d are opened first to provide heated and pressurized gas (e.g., air) through conduits 56a-56d and to the gas jet outlets 46 of the first through fourth zones Z1-Z4 to commence lifting and bending of the glass sheet G. Pressurized gas from the gas source 52 may be heated during its flow into and through a heated path in the heated chamber 26 of the bending station 14. After sufficient lifting and/or bending of the glass sheet G, such as against the first upper mold 27, end portions of the glass sheet G are aligned with central axes 58a of the peripheral gas jet outlets 46a of the fifth zone Z5. The valves 54e may then be opened to provide heated and pressurized gas (e.g., air) to the peripheral gas jet outlets 46a of the fifth zone Z5 so that jet streams 48 emitted from the peripheral gas jet outlets 46a of the fifth zone Z5 may contact end portions of the glass sheet G and cause further bending and/or lifting of the glass sheet G, such as against the first upper mold 27. Without such sequential operation, jet streams 48a emitted from the peripheral gas jet outlets 46a of the fifth zone Z5 may cause gas to be introduced between the gas sheet G and the first upper mold 27, which may inhibit full desired bending of the glass sheet G and/or inhibit adequate support against the first upper mold 27 by vacuum drawn at the first upper mold surface 38.

In addition to providing sequential control of the zones Z1-Z5, the valves 54 may be adjustably controlled to vary the gas pressure supplied to the conduits 56 and gas jet outlets 46. As another example, the valves 54 may be configured as on/off valves, and the lift device 18 may further include a pressure regulator (e.g., programmable electronic proportional pressure regulator) upstream of each valve 54 for controlling pressure in each respective conduit 56. Of course, the valving and control for supplying the gas jet array 44 can also be constructed in different ways than the specific way shown to sequentially and adjustably control the amount of lifting and support at the central, intermediate and end portions of the glass sheet G. Furthermore, this operation takes place after the downward movement of the first upper mold 27 to receive the glass sheet G for the first stage of forming and can then be terminated while the vacuum continues to be drawn at the first upper mold surface 38 to continue the support of the glass sheet G. The vacuum may be continued until release of the glass sheet G onto the lower mold 30 and such termination may be accompanied by supply of positive pressure air supplied by the gas jet pump 72.

It is also possible to assist the gas jet outlets 46 with mechanical pressing of the glass sheet G against the first upper mold 27 at its downwardly facing surface 38 so as to ensure completed glass contact therewith even with abrupt curvature at one or more locations. For example, this type of pressing can be performed by having one or more press members mounted on the first upper mold 27 and operated by the controller 88 through one or more actuators that extend between the first upper mold 27 and the press members, which may pivot or otherwise move relative to the first upper mold 27. See U.S. Pat. No. 4,514,208, which discloses mechanical pressing against an upper mold and is hereby incorporated by reference in its entirety.

Figure 13:
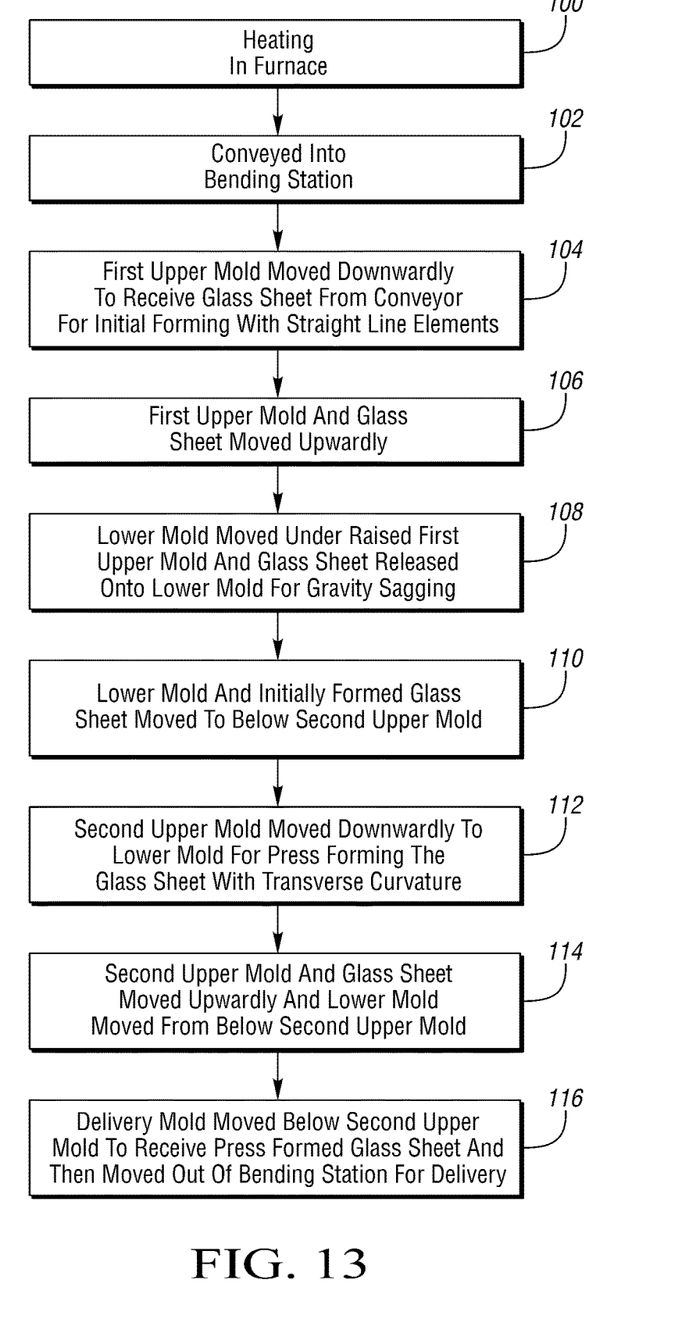
FIG. 13 is a flow chart that illustrates the three stage hot glass sheet forming operation.

With reference to the flow chart of FIG. 13, processing of the glass sheet G in the system 10 begins by heating 100 of the glass sheet (such as to a temperature in the range of 575° C. to 675° C., or to a temperature of at least 575° C.) in the furnace and its subsequent conveyance 102 after heating into the bending station to begin the press forming or bending operation. The first upper mold is then moved downwardly, as illustrated at 104, to receive the glass sheet for the initial forming with curvature in the first direction and straight line elements in the second transverse direction. As mentioned above, the lift device according to the present disclosure functions to lift the glass sheet toward the first upper mold, and the sequential commencement of operation of inner gas jet outlets followed by the peripheral gas jet outlets provides improved lifting and initial bending of the glass sheet against the first upper mold. Next, the first upper mold and glass sheet are moved upwardly 106 and, as shown at 108, the lower mold is subsequently moved under the raised first upper mold and the glass sheet is released onto the lower mold for the gravity sagging that starts the transverse curvature. The lower mold and initially formed glass sheet are then moved as shown by 110 to below the second upper mold, which is then moved downwardly as shown by 112 to press form the initially formed glass sheet with transverse curvature. The second upper mold is then moved upwardly as shown at 114 and the lower mold is moved out from below the second upper mold, followed by the delivery mold movement 116 below the second upper mold to receive the formed glass sheet for delivery. The downward second upper mold movement shown by 112 initiates the press forming of the glass sheet with the lower mold as vacuum is supplied to the second upper mold to provide the press forming in transverse directions with optics that are enhanced by the initial forming of the glass sheet with straight line elements followed by the gravity sagging before the press forming.

Figure 14:
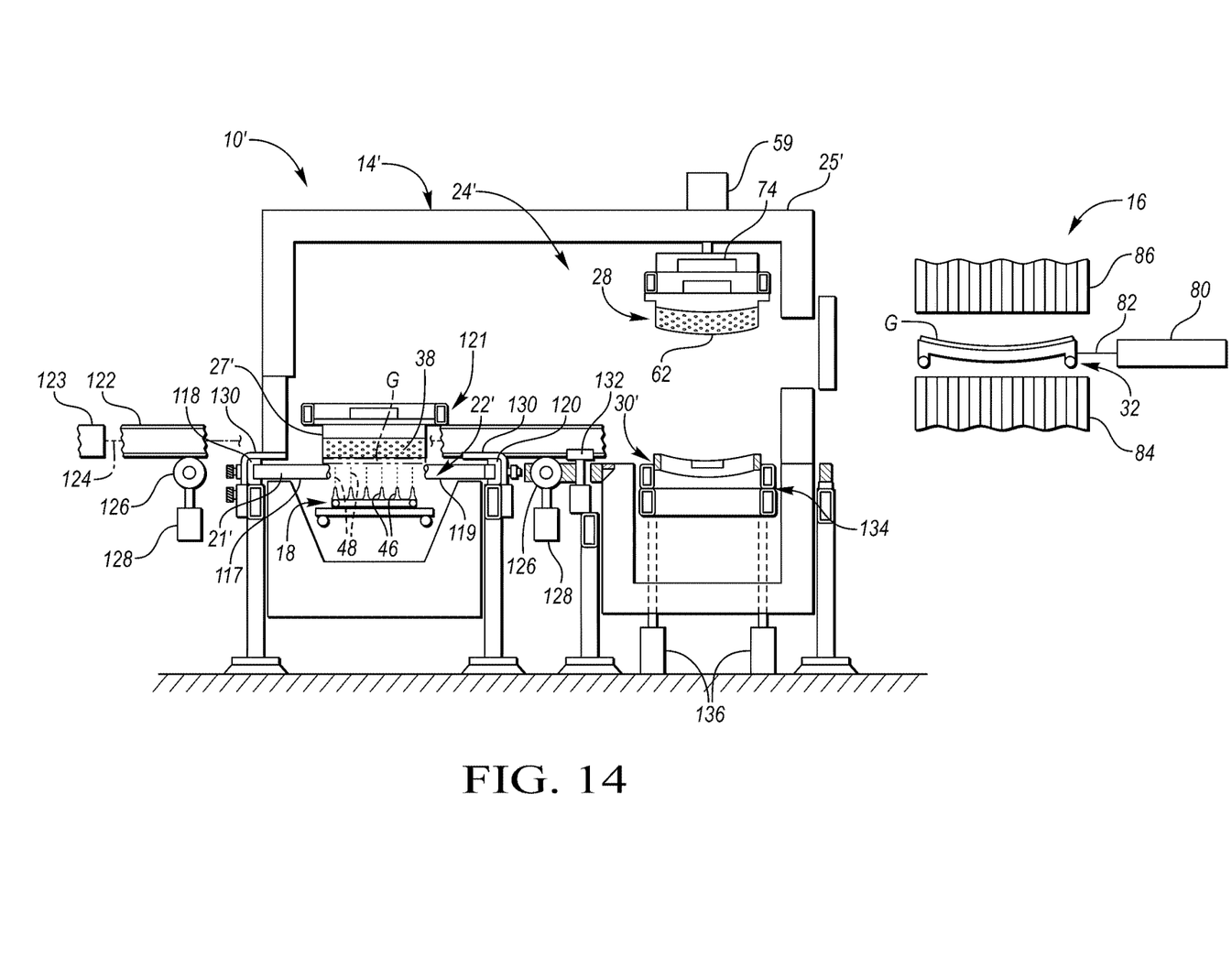
FIG. 14 is a view taken in the same direction as FIG. 2 but illustrating another embodiment of a three stage forming station including a lift device according to the disclosure.

Referring to FIG. 14, another embodiment 14' of a three stage forming or bending station is shown with which the lift device 18 according to the present disclosure may be used. The forming station 14' is part of a glass processing system 10' that has an upstream furnace (not shown), like the glass processing system 10 described above in detail. Furthermore, the forming station 14' has many of the same components that operate like those of the previously described embodiment, such that like references numerals are applied to like components, except that the reference numbers for the components of the forming station 14' may each include a prime mark. Furthermore, much of the previous description is applicable to the forming station 14' and thus will not be repeated.

Figure 15:
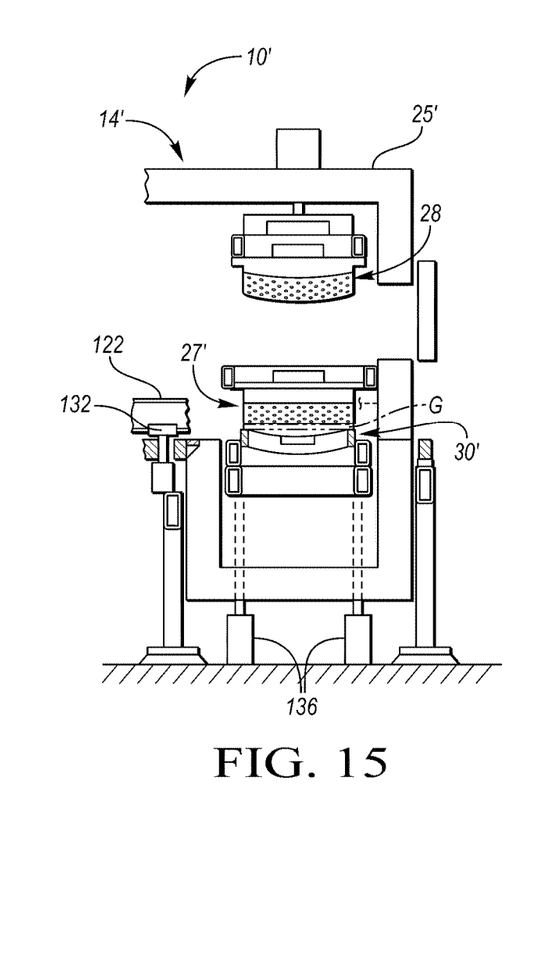
FIGS. 15 and 16 are partial views of the forming station of FIG. 14 illustrating glass sheet processing during a cycle of operation of the system.
Figure 16:
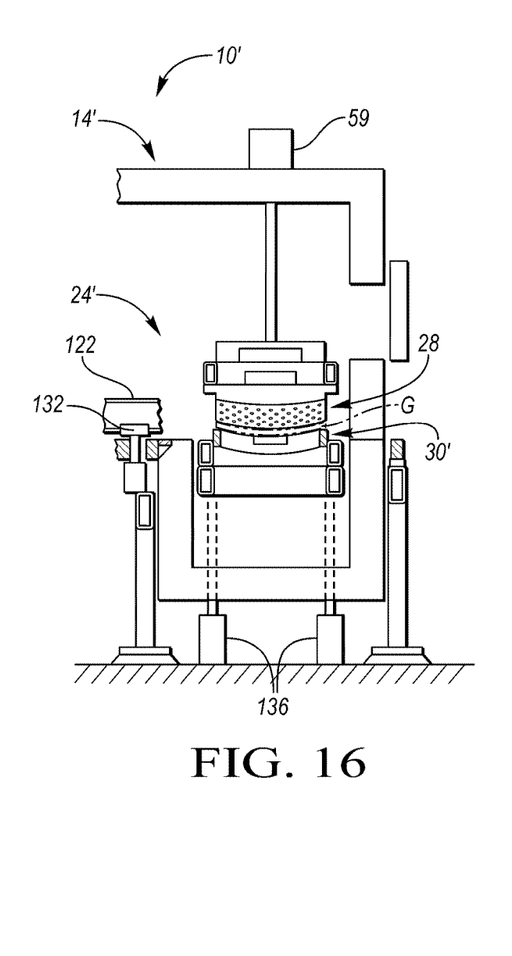

In the forming station 14' illustrated in FIGS. 14-16, a heated glass sheet G on a conveyor or conveyor system 22' may be lifted off of rolls or rollers 21' of the conveyor system 22' by the lift device 18, so that the glass sheet G may be received by first upper mold 27'. As mentioned above, the first upper mold 27' may also have an array of vacuum holes through which a vacuum may be drawn to assist in initial lifting of the glass sheet G and to then support the glass sheet against the first upper mold 27'.

In the embodiment shown in FIG. 14, the rollers 21' of the conveyor system 22' have at least one end disposed inside of housing 25'. For example, each roller 21' has one end 117 that can extend outwardly of the housing 25' to be rotatively driven by a schematically illustrated drive mechanism 118, while another end 119 of each roller 21' is located at a heated location of the forming station 14' (e.g., within a heated chamber, defined by housing 25', that is heated to a temperature in the range of 610° C. to 725° C.) and is received by a roller support structure 120 schematically illustrated in FIG. 14 (the center section of the roller 21' shown in FIG. 14 is broken away to show jets 48 from the lift device 18). Furthermore, the roller support structure 120 may have an elongated shape along the direction of conveyance C and include an elongated cooling unit (not shown) having a housing defining a cooling chamber that receives and has bearings that rotatably support the aligned set of roller ends 119. Additional details of the conveyor system 22' are disclosed in U.S. patent application Ser. No. 14/929,763, filed Nov. 2, 2015, which is hereby incorporated by reference in its entirety.

With the above configuration of the conveyor system 22', spacing between adjacent rollers 21' may be fixed or not easily adjusted (e.g., adjacent rollers 21' may be spaced apart by 4 inches, center-to-center, and each roller 21' may have a 2½ inch diameter). As mentioned above, the gas outlets 46 of the lift device 18 may be configured or arranged such that the associated gas jets 48 pass between the rollers 21'. For example, some of the gas jet outlets 46 may be oriented generally vertically, and other gas jet outlets 46 may be angled as mentioned above in detail. Furthermore, the angle of each gas jet outlet 46 may be selected or designed to account for flow influencing factors (e.g., Bernoulli effect, Coanda effect, etc.) that may be experienced when the associated gas jet 48 passes by one or more rollers 21'. For example, a particular angle of a gas jet outlet 46 may be increased or decreased to account for tendency of the corresponding gas jet 48 to be attracted to one or both rollers 21' between which the gas jet 48 passes.

After the glass sheet G is supported against the first upper mold 27' as described above, the first upper mold 27' is moved horizontally from its pickup position shown in FIG. 14 to a delivery position shown in FIG. 15 where the glass sheet G is released onto lower mold 30'. This is different from the prior embodiment where the lower mold 30 provides the horizontal movement. After the glass sheet is deposited on the lower mold 30' by the first upper mold 27', the first upper mold 27' moves back from its delivery position shown in FIG. 15 to its pickup position shown in FIG. 14 and the second upper mold 28 moves downwardly as shown in FIG. 16 to cooperate with the lower mold in press forming the glass sheet as previously described. After the press forming, the second upper mold 28 moves upwardly with the glass sheet supported against its downwardly facing surface 62 by a drawn vacuum as previously described and the delivery mold 32 shown in FIG. 14 is moved from the quench station 16 into the forming station 14' to receive the glass sheet for movement back out to the quench station between the lower and upper quench heads 84 and 86 for quenching as also previously described.

As shown in FIG. 14, the first upper mold 27' has a frame 121 that is supported by elongated beams 122 (only one shown) that are moved by an actuator 123 through a connection 124. These beams 122 are supported by associated rollers 126 that are mounted by actuators 128 to provide vertical movement of the beams and hence vertical movement of the first upper mold 27' during its operation. More specifically, the first upper mold 27' can be moved downwardly to about one half inch (12 to 15 mm) from the conveyor system 22' for the initial pickup of the glass sheet and can then be moved upwardly so as to move above drive mechanism covers 130 located at the ends of conveyor rollers 21' to reduce heat flow from the interior of the forming station to the factory ambient. Lateral rollers 132 also contact the beams to provide lateral positioning during movement of the first upper mold 27' between its pickup position shown in FIG. 14 and its delivery position shown in FIG. 15.

The forming station 14' illustrated in FIGS. 14-16 thus also has three stages of operation wherein the glass sheet is formed on the first upper mold 27' with curvature in a first direction and straight line elements in a second direction transverse to the first direction, by gravity on the lower mold 30' after receipt thereby from the first upper mold 27' in its delivery position shown in FIG. 15, and finally by the press forming between the second upper mold 28 and the lower mold 30' as shown in FIG. 16.

The lower mold 30' as illustrated is supported by a framework 134 that is supported by actuators 136, such as screw jacks, for vertical movement. This vertical movement can be downward to allow the first upper mold 27' to move over the lower mold 30' and then upward so that the release of the glass sheet is at a more closely spaced relationship to control positioning. In addition, the vertical movement of the lower mold 30' can also be used in cooperation with the vertical movement of the second upper mold 28 to perform the press bending.

Figure 17:
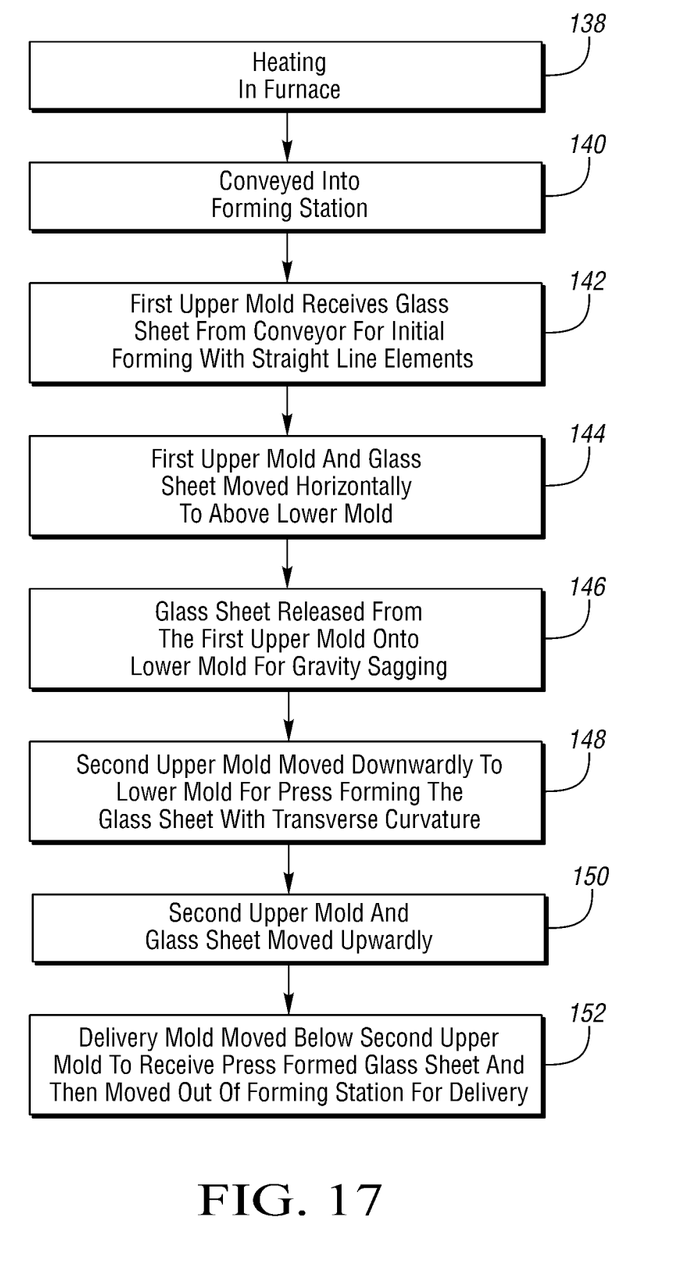
FIG. 17 is a flow chart that illustrates the three stage hot glass sheet forming operation of the forming station embodiment of FIGS. 14-16.

With reference to the flow chart of FIG. 17, the embodiment of FIGS. 14-16 performs the press forming operation beginning by heating 138 of the glass sheet G in the furnace (such as to a temperature in the range of 575° C. to 675° C., or to a temperature of at least 575° C.) and its subsequent conveyance 140 into the forming station, followed by the first upper mold receiving the glass sheet from the conveyor system for initial forming with straight line elements in the first stage 142, and then the horizontal movement 144 of the first upper mold and the glass sheet to above the lower mold. Then, the glass sheet is released 146 from the first upper mold onto the lower mold to provide gravity sagging in the second stage, which can be performed in a shorter time than when the lower mold moves horizontally. The second upper mold is then moved downwardly at 148 to the lower mold for press forming with transverse curvature in the third stage. Next, the second upper mold and glass sheet are moved upwardly at 150, followed by the delivery mold movement 152 below the second upper mold to receive the press formed glass sheet. The delivery mold is then moved out of the forming station for delivery.

Both embodiments can have reduced cycle time by the vertical positioning of the constructions disclosed. In the embodiment of FIGS. 1-13, the vertical positioning permits both the lower mold 30 and the delivery mold 32 to be below the second upper mold 28 at the same time so successive cycles overlap to reduce cycle time. In the embodiment of FIGS. 14-17, the vertical positioning permits both the first upper mold 27' and the delivery mold 32 to be below the second upper mold 28 at the same time so successive cycles overlap to reduce cycle time.

Additional details of the above described three stage forming or bending stations may be found in U.S. application Ser. No. 14/174,265, which is hereby incorporated by reference in its entirety. Of course a lift device according to the present disclosure may be used with any suitable bending station or glass processing system. For example, a lift device according to the present disclosure may be used to lift a glass sheet toward any suitable tool (e.g., mold, shuttle, etc.).

Generally then, a method according to the present disclosure of lifting a glass sheet in a glass processing system includes positioning the glass sheet above a lift jet array including multiple peripheral lift jet outlets and multiple inner lift jet outlets disposed inwardly of the peripheral lift jet outlets. The method further includes commencing operation of at least one of the inner lift jet outlets such that gas flows from the at least one inner lift jet outlet toward the glass sheet, and commencing operation of at least one of the peripheral lift jet outlets such that gas flows from the at least one peripheral lift jet outlet toward a peripheral portion of the glass sheet. The lift jet outlets are operable to facilitate lifting of the glass sheet toward a tool, and wherein commencing operation of the at least one peripheral lift jet outlet is performed subsequent to commencing operation of the at least one inner lift jet outlet to inhibit gas from flowing between the glass sheet and the tool.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A lift device for lifting a glass sheet in a glass processing system that includes a conveyor system having a plurality of rollers for conveying the glass sheet, the lift device comprising:
a lift jet array including peripheral lift jet outlets and inner lift jet outlets disposed inwardly of the peripheral lift jet outlets, the peripheral lift jet outlets and the inner lift jet outlets being disposed below the rollers when the lift device is used with the glass processing system, and each lift jet outlet being operable to allow gas to flow toward the glass sheet; and
a control unit for controlling operation of the lift jet outlets, the control unit being configured to commence operation of at least one of the inner lift jet outlets prior to commencing operation of at least one of the peripheral lift jet outlets.

2. The lift device of claim 1 wherein the at least one peripheral lift jet outlet is configured to be positioned outwardly of the glass sheet when the glass sheet is positioned above the lift jet array, and the at least one peripheral lift jet outlet is angled toward a central plane of the lift jet array.

3. The lift device of claim 2 wherein at least one of the inner lift jet outlets positioned proximate the at least one peripheral lift jet outlet is angled away from the central plane of the lift jet array.

4. The lift device of claim 3 wherein at least another one of the inner lift jet outlets positioned proximate the at least one peripheral lift jet outlet is angled toward the central plane of the lift jet array.

5. The lift device of claim 1 wherein the at least one peripheral lift jet outlet is configured to be positioned outwardly of the glass sheet when the glass sheet is positioned above the lift jet array, the at least one peripheral lift jet outlet is angled toward a central plane of the lift jet array, and at least one of the inner lift jet outlets positioned on a same side of the central plane as the at least one peripheral lift jet outlet is angled away from the central plane.

6. The lift device of claim 5 wherein at least another one of the inner lift jet outlets positioned on a same side of the central plane as the at least one peripheral lift jet outlet is angled toward the central plane.

7. The lift device of claim 1 wherein multiple peripheral lift jet outlets are configured to be positioned outwardly of the glass sheet when the glass sheet is positioned above the lift jet array, and each of the multiple peripheral lift jet outlets is angled toward a central plane of the lift jet array.

8. The lift device of claim 7 wherein the multiple peripheral lift jet outlets include at least two peripheral lift jet outlets at each end of the lift jet array.

9. The lift device of claim 1 wherein the peripheral lift jet outlets define an outline that is different than a periphery of the glass sheet when the glass sheet is positioned above the lift jet array and in an un-lifted state.

10. A glass processing system comprising:
a glass sheet bending station including a conveyor system having multiple conveyor rollers for conveying a heated glass sheet, and a lift device according to claim 1 positioned beneath the conveyor rollers for lifting the glass sheet off of the conveyor rollers.

11. The lift device of claim 1 further comprising a first supply conduit for supplying gas to the at least one inner lift jet outlet, a second supply conduit for supplying gas to the at least one peripheral lift jet outlet, a pressurized gas source connected to the first and second supply conduits, and first and second controllable valves associated with the first and second supply conduits, respectively, wherein the control unit is operable to open the first controllable valve prior to opening the second controllable valve so that a jet stream emitted from the at least one peripheral lift jet outlet contacts the glass sheet after a jet stream emitted from the at least one inner lift jet outlet contacts the glass sheet.

12. The lift device of claim 1 wherein the inner lift jet outlets are provided in four separately controllable zones, and the peripheral lift jet outlets are provided in a fifth zone that is separately controllable relative to the four zones, and wherein the lift device further comprises a pressurized gas source, five supply conduits that are each configured to supply gas from the pressurized gas source to one of the zones, and five controllable valves that are each associated with one of the supply conduits, and wherein the control unit is operable to open the controllable valves associated with the supply conduits for the four zones prior to opening the controllable valve associated with the supply conduit for the fifth zone.

13. A lift device for lifting a glass sheet in a glass processing system that includes a conveyor system having a plurality of rollers for conveying the glass sheet, the lifting device comprising:
a lift jet array including multiple peripheral lift jet outlets and multiple inner lift jet outlets disposed inwardly of the peripheral lift jet outlets, wherein at least one peripheral lift jet outlet is angled toward a central plane of the lift jet array, and at least one inner lift jet outlet proximate the at least one peripheral lift jet outlet is angled away from the central plane, and wherein the peripheral lift jet outlets and the inner lift jet outlets are disposed below the rollers when the lift device is used with the glass processing system.

14. The lift device of claim 13 wherein at least another one of the inner lift jet outlets positioned proximate the at least one peripheral lift jet outlet is angled toward the central plane of the lift jet array.

15. The lift device of claim 13 wherein the lift jet outlets are each configured to allow gas to flow between conveyor rollers of the glass processing system.

16. The lift device of claim 13 wherein the at least one peripheral lift jet outlet includes a first peripheral lift jet outlet configured to provide a gas jet angled toward the central plane for contacting a first portion of the glass sheet, and the at least one inner lift jet outlet includes a first inner lift jet outlet configured to provide a gas jet angled away from the central plane for contacting the first portion of the glass sheet.

17. A glass processing system comprising:
a glass sheet forming station including a conveyor system having multiple conveyor rollers for conveying a heated glass sheet, and a lift device according to claim 13 positioned beneath the conveyor rollers for lifting the glass sheet off of the conveyor rollers.

18. The lift device of claim 13 wherein the peripheral lift jet outlets and the inner lift jet outlets each comprise a nozzle, each nozzle has a single outlet opening, and the nozzles are spaced apart from each other.

19. The lift device of claim 18 wherein each nozzle is configured to provide a single gas jet in a single direction.

20. A method of lifting a glass sheet off of conveyor rollers in a glass processing system, the method comprising:
    positioning the glass sheet above a lift jet array including multiple peripheral lift jet outlets and multiple inner lift jet outlets disposed inwardly of the peripheral lift jet outlets, wherein the peripheral lift jet outlets and the inner lift jet outlets are disposed below the conveyor rollers;
    commencing operation of at least one of the inner lift jet outlets such that gas flows from the at least one inner lift jet outlet toward the glass sheet; and
    commencing operation of at least one of the peripheral lift jet outlets such that gas flows from the at least one peripheral lift jet outlet toward a peripheral portion of the glass sheet;
    wherein the lift jet outlets are operable to facilitate lifting of the glass sheet toward a tool, and wherein commencing operation of the at least one peripheral lift jet outlet is performed subsequent to commencing operation of the at least one inner lift jet outlet to inhibit gas from flowing between the glass sheet and the tool.

21. The method of claim 20 wherein the at least one peripheral lift jet outlet is configured to be positioned outwardly of the glass sheet when the glass sheet is positioned above the lift jet array, and the at least one peripheral lift jet outlet is angled toward a central plane of the lift jet array.

22. The method of claim 21 wherein at least one of the inner lift jet outlets positioned proximate the at least one peripheral lift jet outlet is angled away from the central plane of the lift jet array.

23. The method of claim 20 wherein the peripheral lift jet outlets define an outline that is different than a periphery of the glass sheet when the glass sheet is positioned above the lift jet array but not yet lifted.

24. The method of claim 20 wherein a first supply conduit is connected to the at least one inner lift jet outlet for supplying gas to the at least one inner lift jet outlet, a second supply conduit is connected to the at least one peripheral lift jet outlet for supplying gas to the at least one peripheral lift jet outlet, a pressurized gas source is connected to the first and second supply conduits, and first and second controllable valves are associated with the first and second supply conduits, respectively, wherein commencing operation of the at least one inner lift jet outlet comprises opening the first controllable valve, and commencing operation of the at least one peripheral lift jet outlet comprises opening the second controllable valve, and wherein opening the second controllable valve is performed subsequent to opening the first controllable valve.

* * * * *